United States Patent [19]

Kutash

[11] 3,844,022

[45] Oct. 29, 1974

[54] METHOD OF MAKING A UNIVERSAL FLEXURAL ASSEMBLY

[75] Inventor: Richard A. Kutash, Yorkville, N.Y.

[73] Assignee: The Bendix Corporation, Teterboro, N.J.

[22] Filed: Sept. 5, 1972

[21] Appl. No.: 286,368

[52] U.S. Cl.................. 29/436, 29/416, 29/418, 29/423, 64/17 R
[51] Int. Cl............................................ B23p 11/00
[58] Field of Search............ 29/434, 436, 416, 418, 29/557, 423; 64/15 B, 17 R, 17 SP; 308/2 A

[56] References Cited
UNITED STATES PATENTS

| 3,039,183 | 6/1962 | Laster | 29/416 |
| 3,381,986 | 5/1968 | Seelig | 308/2A |
| 3,499,299 | 3/1970 | Hector | 64/15 |
| 3,574,277 | 4/1971 | Paine | 64/18 |

Primary Examiner—Charles W. Lanham
Assistant Examiner—D. C. Crane
Attorney, Agent, or Firm—Anthony F. Cuoco; S. H. Hartz

[57] ABSTRACT

A method of forming a universal flexural assembly having resiliency apertures disposed coincident with perpendicular axes of universal motion and freedom of motion spaces respectively disposed about and concentric with said apertures comprising the steps of providing an integral body with freedom of motion chambers and said resiliency apertures therein, inserting resilient coupling members within said resiliency apertures, and removing excess material from said body to transform said freedom of motion chambers into said freedom of motion spaces. The flexural assembly made according to the method disclosed herein is capable of executing virtually loss-free rotational universal movement about two perpendicularly disposed axes while torque may be simultaneously and uninhibitedly transmitted through the assembly.

4 Claims, 5 Drawing Figures 3,844,022

METHOD OF MAKING A UNIVERSAL FLEXURAL ASSEMBLY

CROSS REFERENCE TO RELATED APPLICATIONS

This invention relates to a commonly assigned copending patent application Ser. No. 286,506 filed on even date in the name of Frederick A. Seelig.

FIELD OF THE INVENTION

The present invention relates to a method of making universal couplings which connect two rotatable shafts such that rotating movement and driving torques required for the driving can be transmitted from one shaft to a second shaft with both shafts being free to make universal flexible motions relative to each other, and more particularly concerns a method of making a universal flexural pivot which provides limited relative universal rotation between a plurality of parts by flexing a plurality of crossed, flat springs operatively interconnecting the various parts. Such universal joints are used in many fields, for example, in precision drive mechanisms and in the gyro art (free gyroscopes) where the problem is to arrange a rotor around a shaft such that the rotor can be driven from the shaft but at the same time such that the rotor has a certain degree of freedom to change its angular position relative to the driving shaft.

DESCRIPTION OF THE PRIOR ART

In previously known constructions where rotating shafts are imparted with bending motions and where it is required that the rotating shafts make angular deflections as well, the problems are normally solved, for example, by means of conventional cardan joints or slender shafts. The cardan joint build-up by common bearings is rigid for the rotating motion and can be dimensioned for large torsional torques but has the essential drawback especially in gyro applications that the bearings introduce a non-linear frictional torque in respect of bending motions about axis in a plane perpendicular to the rotation axis. The support by means of slender shafts, for example, achieved by turning down a section of a shaft, has the drawback that it will be weak also for torsional torques and cannot be dimensioned for transmission of large torques if there is also required to provide softer bending motions.

A universal joint is shown in U.S. Pat. No. 2,966,049, for instance, consisting of a rigid intermediate portion having an extension in the direction of the rotation axis, which portion is connected with two rotatable shafts to two pairs of radially arranged leaf springs extending in the direction of the rotation axis with the springs, each pair aligned diametrically opposite each other, the plane of the springs of one pair being common to the springs of the pair and lying perpendicular to the springs of the other pair for allowing bending about two mutually perpendicular axes in said plane, the leaf springs in each pair having one end connected to the respective rotatable shafts and the opposite end connected to the intermediate portion at an attachment point lying beyond the bending axis as measured from the respective shaft.

An improvement on the above-mentioned universal joint was disclosed in U.S. Pat. No. 3,499,299, wherein a universal joint fabricated from a solid shaft of circular sectional area comprising four radial recesses regularly distributed around the periphery of the member, with the recesses leaving a central body forming the intermediate connecting member, and having leaf springs constituting partition walls between the recesses, the leaf springs being separated from the intermediate connecting member at one end and from the adjacent shaft portion at the other. The types of universal joints described by these above-named U.S. patents had many disadvantages and drawbacks including the following. First, in order to ensure radial stability the flexures have to be of heavy construction; if the flexures were narrower, the torque peaks would have to be decreased. Secondly, torque is transmitted along the long (bending) axes of the flexures. Third, in order to transmit high torques, the heavier leaf springs would permit only relatively small angular (bending) deflection. Fourth, since the universal joint is made from one piece of stock, the flexure members tend to fatique since they cannot be separately finished as would be the case if separate flexure members could be used. Thus, these types of universal joints lack rigidity in the transverse as well as in the torsional direction.

Another prior art frictionless coupling was disclosed in commonly assigned U.S. Pat. No. 3,381,986, however, this type of coupling is utilized in a different field. That is, this particular type of coupling is used in rocket engine applications wherein the rocket engine is suspended from a rocket body. The purpose of providing universal motion is so that a rocket body may have its course corrected by altering the position of a rocket engine within the body without creating sliding or rolling friction. This design is characterized by combining a plurality of crossed flexure elements of varying dimension with a tubular, generally X-shaped housing and by splitting the housing along the tubular arms so that each spring in an arm is connected on one edge or end to one portion of the arm and on the opposite edge or end to the remaining portion of the arm, the split portions of the housing are able to move on the springs a limited amount relative to each other. It was an object of this patent to provide a frictionless coupling fabricated from hollow tubular members. This coupling was concerned with connecting two members through a flexible coupling so that the members may move independently of each other along two perpendicular planes; this coupling was not designed for transmitting torque from one member to the other through the flexures themselves. As was stated above, this coupling was designed for large installations since it would be extremely difficult to machine slots in tubular portions for small couplings. Also, the lack of symmetry between the four housing parts and three different size springs make this coupling undesirable for economical mass production.

SUMMARY OF THE INVENTION

In a preferred embodiment according to the invention, the method of making a universal flexural assembly is shown comprising the steps of casting an integral body having a central portion and two substantially axially extending yoke portions, said central portion having first and second generally U-shaped chambers orthogonally and inversely disposed relative each other, said central portion also having first and second generally cylindrical bores othogonally disposed such that they intersect at their respective centers, said central and yoke members held together by a plurality of support arms; providing a plurality of resilient coupling members within said first and second cylindrical chambers, the coupling members of each chamber being coincident with the perpendicular axes of rotation; and removing the support arms such that universal relative movement of the first and second yoke portions occurs in response to a force on one of said yoke portions.

It is, therefore, a primary object of the present invention to provide a method of making a torque transmitting universal-type coupling having two axes of freedom of motion and one or more degrees of freedom of motion associated with each axis and which is less massive and less expensive to fabricate than known universal-type couplings.

Another object of the present invention is to provide an improved method of making a universal flexural pivot device which is simply constructed, has few parts, and can be made in small sizes and which retains the advantages of no backlash and no friction or wear with resulting limitations due to lubrication at high temperature.

A further object is to provide a simplified method of more economically manufacturing universal flexural devices wherein known flexible core assemblies are cut in half and inserted within a plurality of resiliency apertures of a unique integral casting, bonded as a unit and then cut to form a universal flexural coupling construction whereby extensive machining of parts and assembly of many parts is avoided.

Another object of this invention is to provide a method of making a universal joint of the torque transmitting type which fulfills high requirements as regards a true transmission of shaft movements and at the same time satisfies requirements of low friction and freedom from play and which may have substantially small dimensions.

Still a further object of the invention is to provide a method of making a universal coupling requiring only one simple machining operation and wherein all the primary parts except for the resilient coupling members are fabricated from a single casting.

It is another important object of this invention to provide a method of making a universal flexural coupling having substantially high rigidity in the radial (torsional) direction without sacrificing any rigidity in the transverse (bending) direction.

It is still a further object to provide a method of making a universal joint which can couple two members such that each member may move independently of the other along two perpendicular planes while simultaneously allowing one member to transmit torque through the point to the other member.

Another object of this invention is to provide a method of making a universal-type coupling wherein the flexures are separately assembled so that a flexural composition may be selected and installed in the coupling to optimize the design requirements of any particular application.

The foregoing objects and advantages of the invention will appear more fully hereafter from the consideration of the description which follows, taken together with the accompanying drawing wherein one embodiment of the invention is illustrated. It is to be expressly understood, however, that the drawing is for the purpose of illustration and description and not to be construed as defining the limits of the invention.

BRIEF DESCRIPTION OF THE DRAWING

The invention is illustrated in the accompanying drawing in which.

DESCRIPTION OF THE PREFERRED EMBODIMENT

Figure 4:
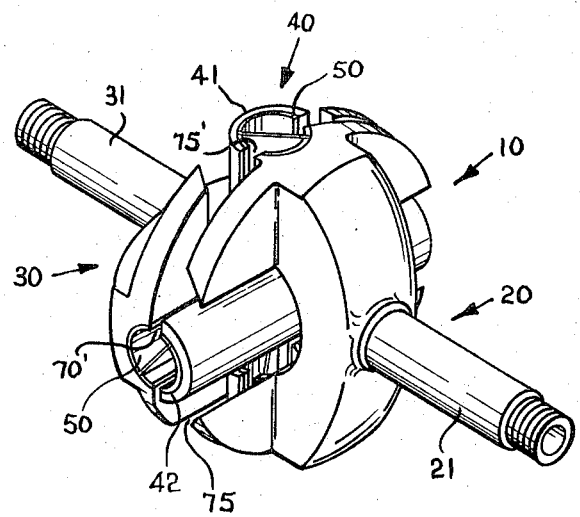
FIG. 4 is a top perspective view of the finished universal assembly.

Referring to FIG. 4 the frictionless universal flexural assembly made according to the method of my invention is shown generally designated by the numeral 10. It can readily be seen that the assembly formed has three primary parts, two yoke members 20 and 30, and an intermediate cross member 40 having a vertically extending portion 41 and a horizontally extending portion 42 (better shown in FIG. 5). The yoke members 20 and 30 are connected to the cross member 40 by a plurality of resilient coupling members 50 to be described in more detail below. Yoke members 20 and 30 have force application portions 21 and 31 extending substantially axial therefrom.

Figure 1:
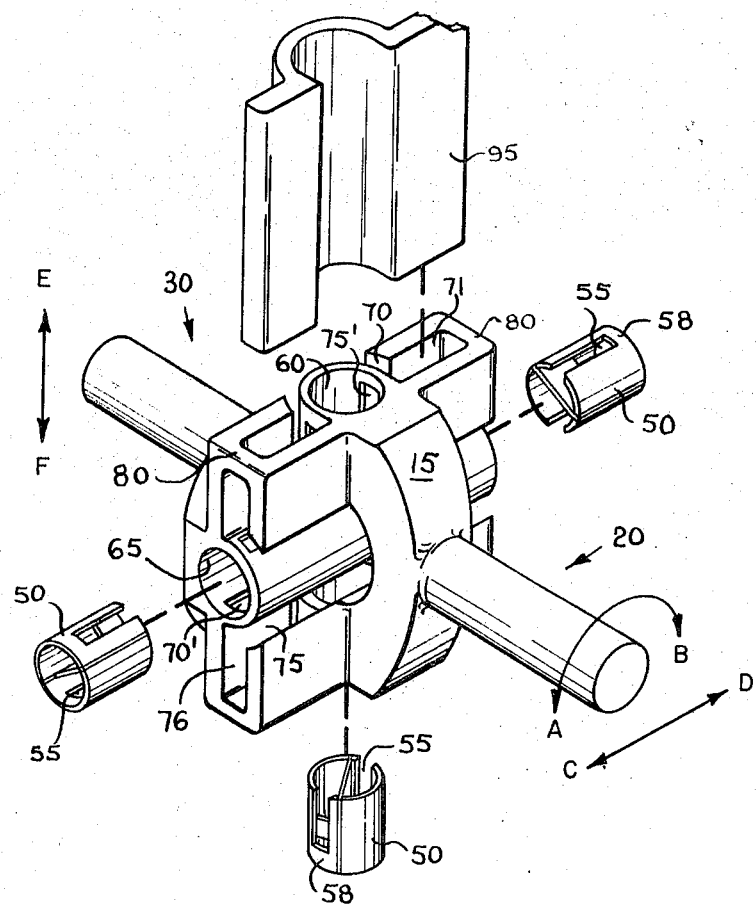
FIG. 1 is a top perspective view showing the position of three of the four resilient coupling members and also showing an alternative means of forming the freedom of motion chambers.
Figure 5:
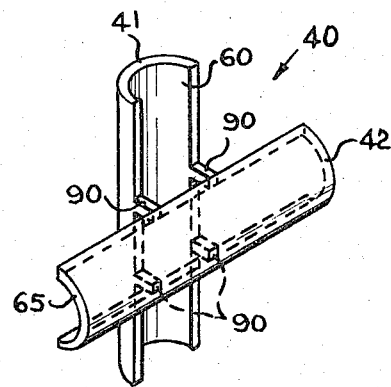
FIG. 5 is an isometric view of part of the structure made according to my method as seen when members 20, 30, and 50 are removed from the assembly shown in FIG. 4.

Referring now to FIG. 1, the method of making my universal flexural assembly is illustrated. The coupling is preferably cast as an integral unitary body 15 in which are provided first and second resiliency chambers 60 and 65 and freedom of motion chambers 70 and 75. Also formed by the casting are a plurality of connecting arms 80 which maintain the integral body 15 as a unitary structure until the only required machining operation is performed. The resiliency apertures are orthogonal and are positioned coincident with the perpendicular axes about which universal motion is available. The freedom of motion chambers 70 and 75 are generally U-shaped having axially extending portions 71 and 76 which protrude perpendicularly from the terminal ends of the U. The freedom of motion chambers 70 and 75 are orthogonally and inversely disposed; i.e., the symmetrical chambers are inverse of each other with the axis of one chamber intersecting the axis of the other chamber at an angle of 90°. Chambers 70 and 75 which form freedom of motion spaces or travel gaps, are disposed about and concentric with the resiliency apertures 60 and 65, respectively, such that each chamber intersects the resiliency aperture disposed perpendicular thereto. That is, freedom of motion chamber 70 forms a travel gap 70' with the resiliency aperture 65, and the freedom of motion chamber 75 forms a travel gap 75' with the resiliency chamber 60. Notice that at this point, yoke members 20 and 30 are held together by connecting or support arms 80, and that the structures 41 and 42 which contain the resiliency apertures 60 and 65, respectively, are connected at the four points 90 as shown in FIG. 5.

Although it is more economical to cast body 15 with the resiliency apertures and the freedom of motion chambers automatically included therein, alternative means to provide these apertures and chambers may also be used. For example, the resiliency apertures 60 and 65 could be drilled, bored or broached after the solid casting is made. Also, freedom of motion chambers 70 and 75 could be formed by electroetching using an electrode such as 95 shown in FIG. 1.

Figure 3:
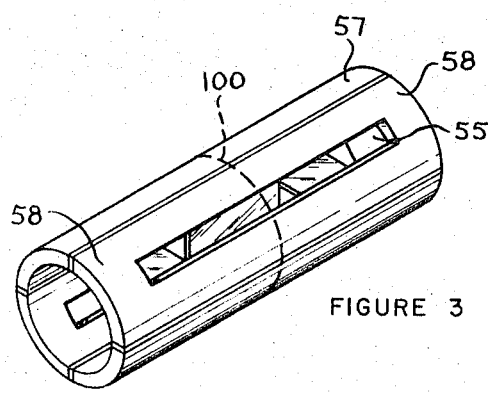
FIG. 3 is an isometric view of an assembled coupling member shown in FIG. 2.
Figure 2:
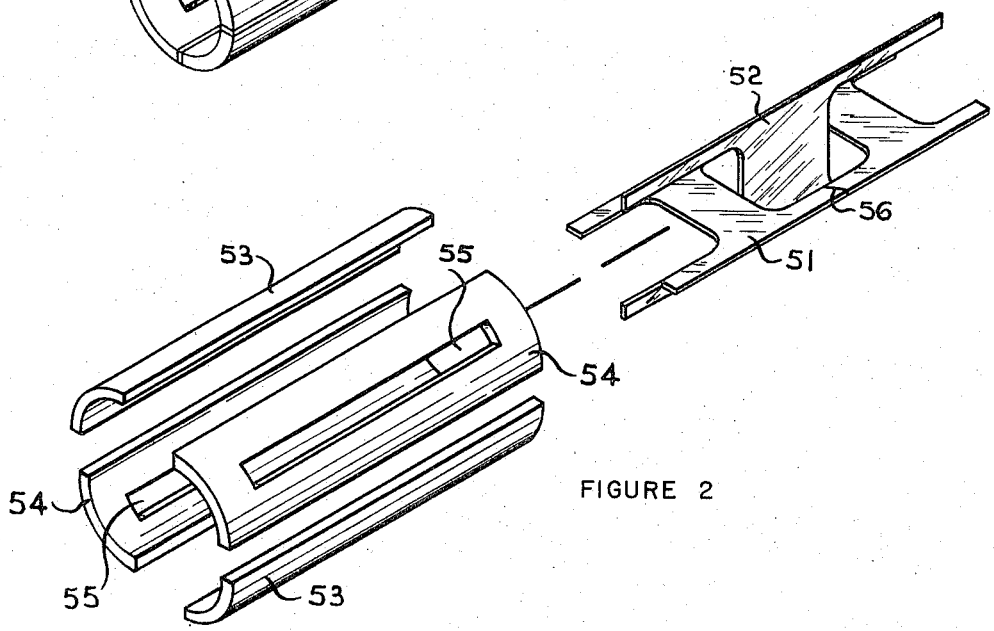
FIG. 2 is an exploded perspective view of the resilient coupling assembly.

Referring to FIG. 2 the method of making resilient coupling members 50 is shown. The flexures 51 and 52 are stamped or chemical milled from resilient stock, the type of metal used dependent on the design requirements for any particular application. The I-shaped flexure 52 is inserted through slot 56 of the H-shaped flexure 51 with the planes of each flexure being perpendicular. Four quadrant members comprised of two identical pair 53 and 54 are circumferentially assembled to the crossed flexures 51 and 52. Quadrant members 54 have axially extending slots 55 formed therein, the slots being radially centered and dimensioned to match the freedom of motion spaces or travel gaps 70' and 75'. The flexures and quadrant members are then brazed in a batch operation to form the unitized resilient coupling member 57 shown in FIG. 3. After brazing, coupling member 57 is cut or parted along line 100 to form two identical coupling members 50 shown in FIG. 1. The ends 58 of the resilient members 50 form retaining caps which maintain members 50 as rigid assemblies until the final grinding operation.

The coupling members 50 are then inserted or encased within the resiliency apertures 60 and 65 with the axially extending slots 55 being aligned with the travel gaps 70' and 75' as was mentioned above. The assembly of the coupling members 50 into the integral body 15 can easily be accomplished with automated equipment. The coupling members 50 are then unitized within the resiliency apertures 60 and 65 in a batch brazing operation and the body 15 may be tempered if required. The entire flexural assembly is then ground along its outer periphery removing the cap members 58 of the resilient coupling members 50 and the connecting or support arms 80 of the housing 15 to permit flexural freedom for bending in two perpendicular planes. That is, yoke 20 is free to move in plane C-D and yoke 30 in plane E-F. The concept of casting the one-piece housing eliminates the need for holding fixtures since the universal assembly maintains its rigidity through the connecting arms 80 and the capped ends 58 of the resilient coupling members 50. Note that the freedom of motion "chambers" 70 and 75 and the corresponding travel gaps 70' and 75' are transformed into freedom of motion "spaces" when the connecting arms 80 are removed. The universal flexural coupling 10 formed by my method can transmit torque rotationally in direction A and/or B with the force application portions 21 and 31 being in any position in planes C-D and/or E-F without being inhibited in any manner by the intermediate structure.

This novel method of fabricating a unique frictionless universal pivot can be utilized for an unlimited range of sizes. Applications can be for miniature gyros or large, highly loaded structural supports. Of course, one skilled in the art will readily appreciate that the universal frictionless coupling according to my invention can be modified in several aspects within the scope of the invention. For example, the force application portions 21 and 31 of the yoke members 20 and 30 could be varied to include threaded-in rods, flanges held with screws, studs or bolts, etc., without a major revision to the concept disclosed. Also, flexures could be directly assembled to the resiliency apertures and welded in place without major revision to the disclosed methods and structure.

It can readily be seen that the present invention accomplishes its stated objects. That is, a method of forming a frictionless torque transmitting universal-type coupling is provided having two axes of freedom of motion and one or more degrees of freedom of motion associated with each axis, and which is of simple design thereby easily lending itself to economical mass production. The assembly made according to my method has substantially high rigidity in the torsional and in the bending directions allowing it to carry high torques while simultaneously permitting high angular deflection in the transverse direction.

It is understood that changes can be made in the disclosed embodiment and methods by persons skilled in the art without departing from the invention as set forth in the appended claims.

I claim:

1. A method of making a universal flexural assembly comprising:
    forming an integral body having a central portion and two substantially axially extending yoke portions, said central portion having first and second generally U-shaped chambers orthogonally and inversely disposed relative each other, said central portion having first and second generally cylindrical bores orthogonally disposed such that they intersect at their respective centers, said central and yoke members held together by a plurality of support arms;
    providing a plurality of resilient coupling members within said first and second cylindrical chambers; and
    removing said support arms such that universal relative movement of said first and second yoke portions occurs in response to a force on one of said yoke portions.

2. The method as claimed in claim 1 wherein said resilient coupling members are provided by stamping a plurality of flexural members from resilient stock;
    assembling said flexural members along substantially perpendicular planes;
    positioning a plurality of quadrant members about said flexures circumferentially; and
    brazing said quadrant members to said flexural members.

3. A method of making a universal flexural assembly comprising:
    casting an integral body having a central portion and two force application portions extending therefrom;
    electroetching two generally U-shaped portions from said central portion leaving a plurality of support arms;
    forming two orthogonally disposed and intersecting bores within said central portion concentric to said U-shaped portions;
    encasing resilient coupling members within said bores; and
    removing said support arms.

4. The method as claimed in claim 3 including in addition unitizing said resilient coupling members to said bores formed in said central portions.

* * * * *